Jan. 20, 1953     A. BULMASH ET AL     2,625,982
AUTO STROLLER
Filed Nov. 27, 1948     3 Sheets-Sheet 1
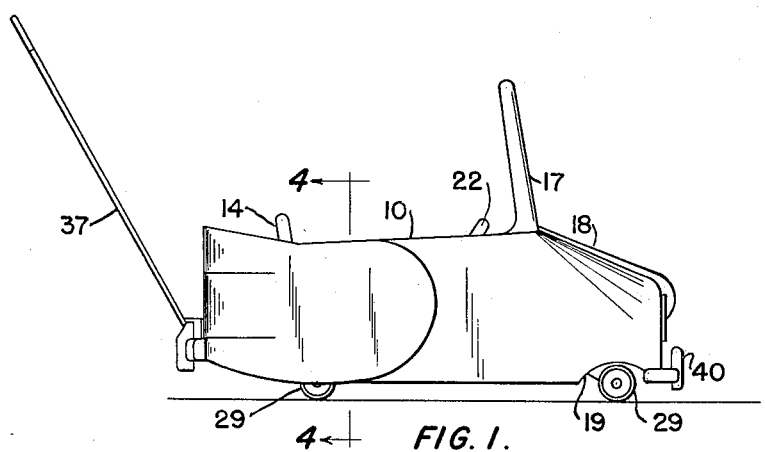
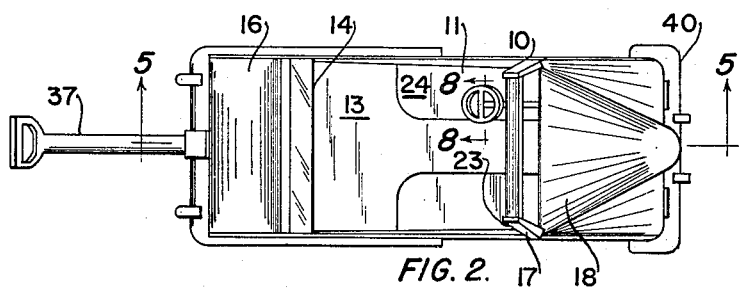
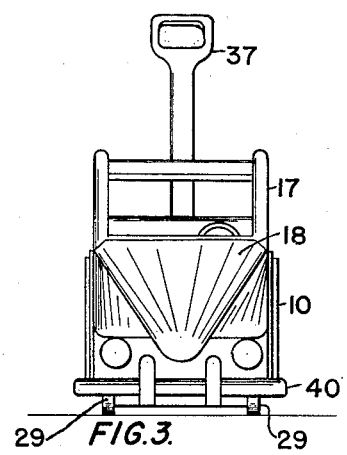
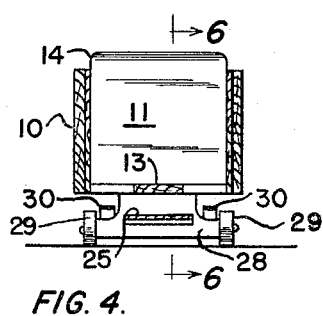
INVENTOR.
ALBERT BULMASH
IRVIN J. POLANSKY
NATHAN C. IRBY.
BY *Howard J. Whelan*
ATTORNEY Jan. 20, 1953
A. BULMASH ET AL
2,625,982
AUTO STROLLER
Filed Nov. 27, 1948
3 Sheets-Sheet 2
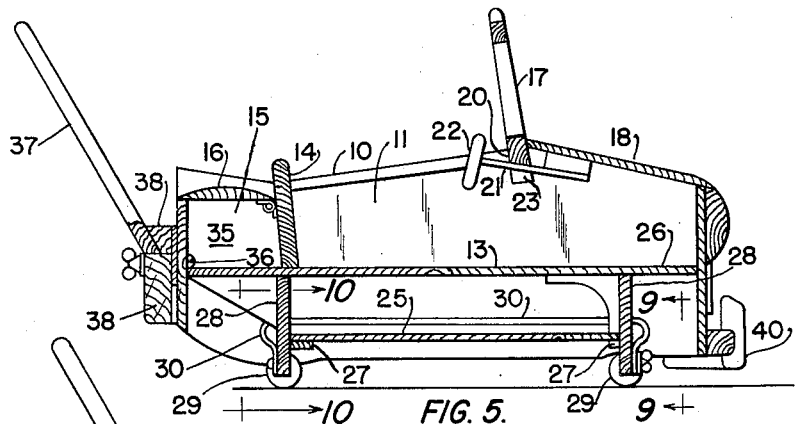
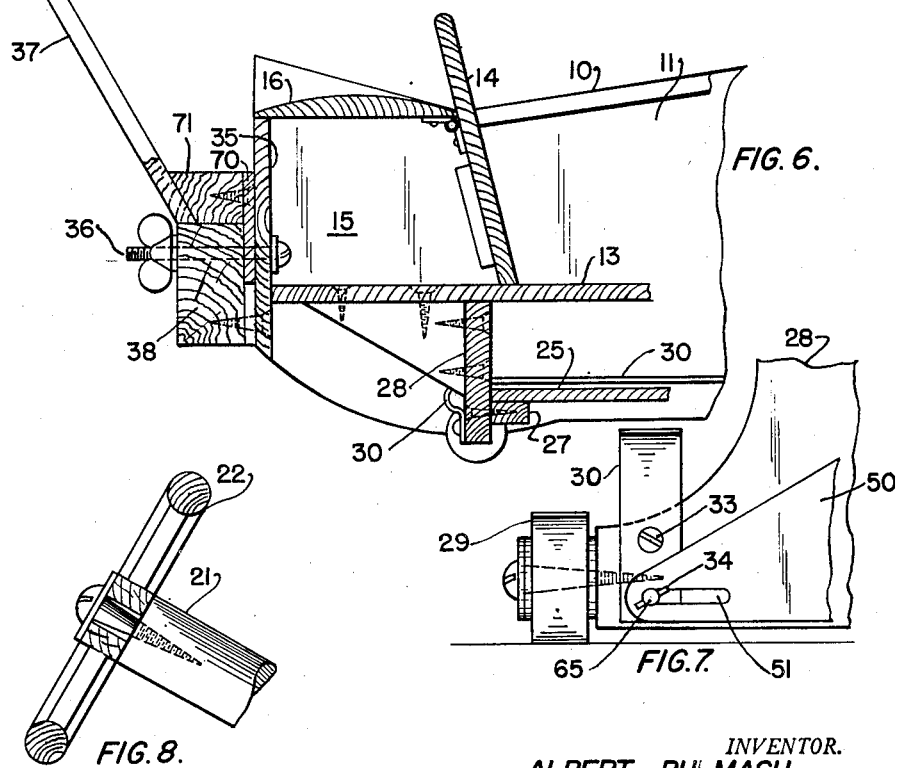
INVENTOR.
ALBERT BULMASH
IRVIN J. POLANSKY
NATHAN C. IRBY.
BY Howard J. Whelan.
ATTORNEY Jan. 20, 1953   A. BULMASH ET AL   2,625,982
AUTO STROLLER
Filed Nov. 27, 1948   3 Sheets-Sheet 3
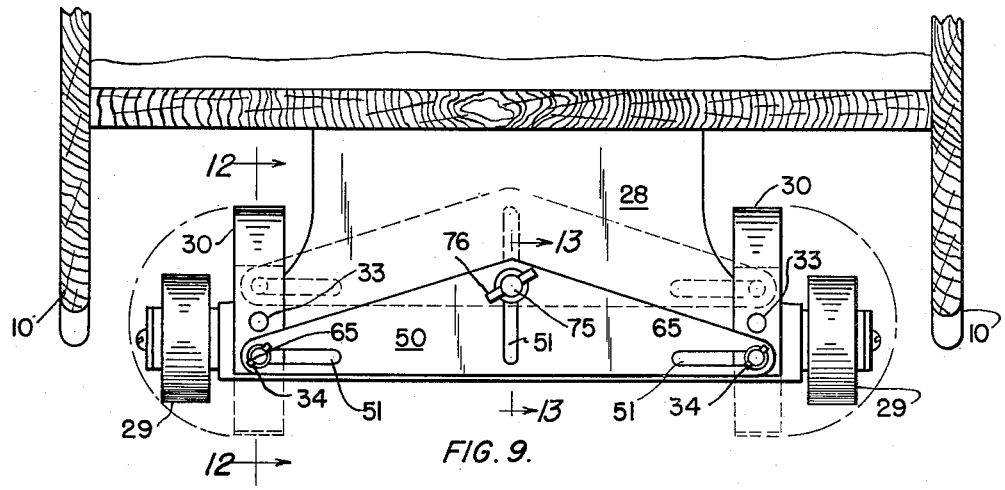
FIG. 9.
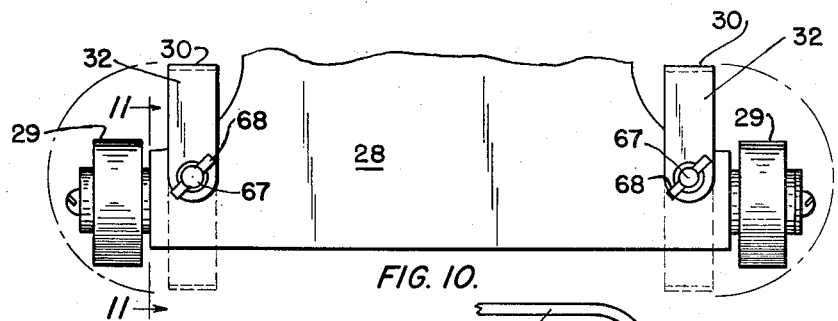
FIG. 10.
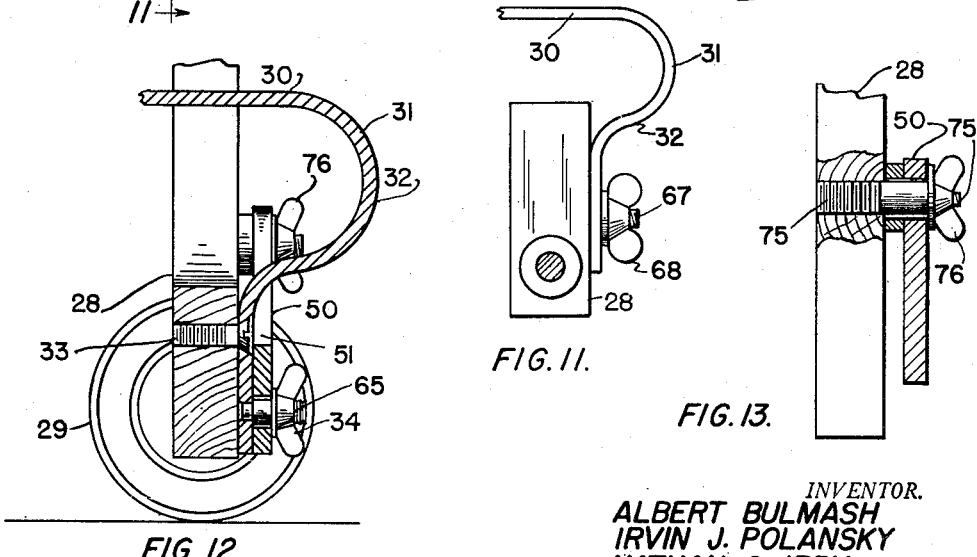
FIG. 11.    FIG. 13.
FIG. 12.
INVENTOR.
ALBERT BULMASH
IRVIN J. POLANSKY
NATHAN C. IRBY.
BY Howard J. Whelan.
ATTORNEY Patented Jan. 20, 1953

2,625,982

UNITED STATES PATENT OFFICE 2,625,982

AUTO STROLLER

Albert Bulmash, Irvin J. Polansky, and
Nathan C. Irby, Baltimore, Md.

Application November 27, 1948, Serial No. 62,302

1 Claim. (Cl. 155—22)

This invention relates to vehicles and more particularly to those intended for the use of infants and small children.

In a particular form of vehicle used for children, a wheeled body is provided on which the child is placed and allowed to sit in a convenient position while his guardian propels the vehicle by means of a handle that he pushes as he walks in back. Provision is also made in the floor of the body to allow the legs of the child to straddle a seat installed in the body and even walk on the ground. However it employs a handle mounted on a steering post and front wheels, which may be held by the child and used by him to guide the vehicle, as well as to maintain himself erect while he is walking in the straddled manner referred to. However, this vehicle has the disadvantage of being somewhat clumsy to use and requiring considerable effort on the part of the guardian to control and move it along. The child can interfere greatly in its travel owing to the fact that he is free to manipulate the steering handle and post. The floor being open limits the use of the vehicle and is inconvenient when the child is tired or restless.

In this invention, the construction of the vehicle enables the vehicle to be used as a vehicle in which the child can sit, walk or sleep. The guiding of the vehicle cannot be interfered with by the child. The child may hold a dummy steering handle but that does not control the movements of the vehicle and the arrangement for supporting a toddling child while he is walking in it is of a most convenient and effective type.

It is therefore the object of the invention to provide a new and improved perambulating vehicle that will avoid one or more of the disadvantages and limitations of the prior art.

Another object of the present invention is to provide a new and improved perambulating vehicle for children that will include in its features, facilities for employing it as an open seated vehicle, or as a stroller or as a push cart, as well as by a slight manipulation of its parts to produce variations in their positions thereon.

A further object of this invention is to provide a new and improved perambulating vehicle for children or for carrying articles that will enable a child to rest therein completely, or stand up and walk with it in a very convenient manner, as well as have various adjustments that will permit the vehicle to be used with wheels or runners and hold articles of relatively small size of interest to the child and his general comfort.

Other objects will be evident as the details of the structure of the invention are disclosed.

In order to make the invention clear and to disclose the principles on which it is founded, reference is made to the accompanying drawings. These drawings in conjunction with the following description, indicate a particular form of the invention by way of example, and especially pertain to a structure usable for an infant between the ages of one and three. The claim also included with the description, emphasize the extent of the field embraced by the invention.

In the drawings:

Figure 1 is a side elevation of the auto stroller embodying this invention;

Figure 2 is a plan view of Figure 1;

Figure 3 is a front elevation of Figure 1;

Figure 4 is a sectional view taken along the arrows 4—4 of Figure 1;

Figure 5 is a sectional view taken along line 5—5 of Figure 2;

Figure 6 is an enlarged sectional view taken along line 6—6 of Figure 4;

Figure 7 is an enlarged view showing a portion of a structural bracket with the wheel attached at one end and showing the plate for controlling the movement of the runners;

Figure 8 is a typical enlarged view of the steering column and steering wheel;

Figure 9 is an enlarged view taken along line 9—9 of Figure 5;

Figure 10 is an enlarged view taken along line 10—10 of Figure 5;

Figure 11 is a sectional view taken along line 11—11 of Figure 10;

Figure 12 is an enlarged sectional view taken along line 12—12 of Figure 9, and

Figure 13 is a sectional view taken along line 13—13 of Figure 9.

The reference numerals used on the drawings refer to the same parts throughout.

In the drawings, the particular structure includes a body 10 that has a hollow shell-like form with an opening 11 in the top through which a child may be positioned. The body has a seat 13 formed on a box-like construction and at the rear of which a compartment 15 is provided in which to hold diapers or other articles of particular interest to a child and his comfort. The seat 13 has a flat back board 14 to support the infant in a sitting position when seated up against it, as well as keep his arms and body out of the way from contact with the rear structure of the vehicle. The box seat 13 has a cover 16 hinged to it to close over the compartment 15. The body 10 has the form of a conventional automobile with an unglazed windshield frame 17 adjacent its tapered hood 18 and the necessary contours 19 to form mudguards. A dashboard 20 under the windshield frame 17 serves as a support for a dummy steering column 21 having a dummy steering wheel 22 attached to it. The column 21 is inserted in clamp 23 mounted on the dash 20 and is adjustable therein to suit the convenience of the occupant in the vehicle. The seat board 13 is extended from the rear to the front of the interior of the body 10. Its form is preferably as indicated in Figures 2 and 4, with a middle section 23 narrowed to provide openings 24 on both sides of it, through which the child can freely drop his feet and legs to rest on the false floor 25. The front plate 26 of the seat board 13 is enlarged to rest on and fill the front of the vehicle interior as well as strengthen it. The false floor board 25 is loose, and held on cleats 27 installed on the walls of the body. However by suitably tilting the board 25, it can be brought into a position where its removal is simple.

When this false floor board 25 is removed, the child in the vehicle can project his feet to the ground or stand up. Sufficient room is provided inside to allow the child to move his legs and feet around to a considerable extent and more or less conveniently. The underside of the seat board 13 is used for the attachment of front and back structural brackets 28 on which wheels 29 are journalled. These wheels 29 support the vehicle and enable it to roll thereon in a longitudinal direction. Also attached to the structural brackets 28 are a pair of horizontal runners 30. These runners are longitudinally disposed, and formed in a U-like structure with the end portions 31 bent back at 32 and pivotally secured to the brackets 28 by screws 33 to rotate through a semi-circular arc over the wheels 29 as indicated by dotted lines in Figures 9 and 10. When in use the runners 30 are lowered by the rotation to a position at a lower level than the wheels and rest on the ground. They raise the wheels out of contact with the ground. They are held in that position by wing nuts 34 and bolts 65 locking them to the transverse triangular plate 50 at the rear as indicated in the drawings. These same bolts hold the runners up against the plate 50 out of the way when not in use. The rears of the runners are pivotally attached to the rear bracket 28 by bolts 67 and held thereto by wing nuts 68. When the runners are up they are out of the way of the child's legs, whether the latter is standing or sitting. The slots 51 in the plate 50 permit the rotation and positioning of the runners as described in conjunction with the vertical reciprocation of the plate. The bolts 65 are offset from the pivot screws 33 at the plate 50 at the front to form a locking action having leverage effect. In the rear the bolts 67 only are used, and while wing nuts 68 are indicated to facilitate clamping, such are not essential, as the bolts on the plate 50 are sufficient.

The rear wall 35 of the body is preferably vertical and holds a bolt 36 that removably holds a pushing handle 37 extending up therefrom at an angle. It has a block 38 mounted on its lower end to provide a suitable attachment where the bolt 36 extends through from the wall 35 and through the plate 70 and block 38. The handle 37 is attached to the plate 70 by spacer 71.

Normally the child sits on the seat 13 with his feet on the floor 25, the wheels 29 supporting the vehicle and the guardian pushing on the handle 37. The runners are used by moving them from a horizontal position under the seat 13 to a vertical position in contact with the ground raising the vehicle so the wheels 29 are out of the way. The bolt 75 and nut 76 are used to keep them in that position, and stopping them from rotating back on their hinges 33. A bumper 40 on front of the vehicle adds to its appearance.

When the child uses the vehicle as a walker, the false floor board 25 is removed so he can stand up in the vehicle with legs extending through the openings 24 on to the ground. At the same time, he holds on to the top bar 17 of the windshield frame. This he can do readily because no provision for glass is made in the frame, although its form follows that of a conventional windshield and serves the same purpose as far as the child is concerned. The dummy steering wheel 22 can be readily moved out of the way if necessary, or in position to be used by the child if preferred, while he is seated in the vehicle. The child can be laid flat in the vehicle if preferred by using a heavy comforter in it. The interior may also be used for carrying parcels as well as the child, to meet the requirements of up-to-date marketing and enable the parent to handle both conveniently. In snowy weather, the runners 30 can be readily moved into position and used in place of the wheels. While the vehicle is primarily intended for pushing, the pusher handle 37 can be removed so the child of the proper size or age can use is independently. The fact that the vehicle has room 15 for the storage of facilities needed by the child, so they will be readily available, is an important feature from a practical point of view, and not anticipated in other vehicles of this type. The old perambulator has a compartment in the middle of its floor where the child is intended to lie, but in this location, it was very much in the way and more modern perambulators were designed without it. In this invention, the accessibility of the compartment 15 is of considerable value. The structure is relatively simple yet is attractive to the observer, the user and the child whom it carries. The hood 18 affords plenty of room in which to place the child and in case he goes to sleep in it, to cover him, while providing ample air space.

While but one general form of the invention is shown in the drawings and described in the specification, it is not desired to limit this application for patent to this particular form, as it is appreciated that other forms of construction could be made that would use the same principles and come within the scope of the appended claim.

Having thus described the invention, what is claimed is:

A child's vehicle comprising an enclosed body having an opening therein for the entrance of the child, a board extending from the front to the rear of the body and providing a seat at its front end, said seat having side openings for the legs of the child to extend therethrough, the back of the body, the back of the seat and the rear end of the board defining a storage compartment, a cover for said compartment hinged to the seat, a front bracket and a rear bracket secured to and beneath said board, a floor board removably secured to and extending between said brackets, whereby, when the floor board is removed, the child may walk directly on the ground, a pair of front and rear wheels mounted on each bracket, respectively, a pair of longitudinal runners, each runner having its opposite ends pivoted to the front and rear brackets, respectively, said runners being swingable to raise the wheels and the vehicle from contact with the ground, means associated with one of said brackets for securing the runners in operative and inoperative position, said means including a plate having slots therein and bolts extending through the adjacent ends of the runners and through said slots, and a handle secured to one end of the vehicle whereby the latter may be propelled.

ALBERT BULMASH.
IRVIN J. POLANSKY.
NATHAN C. IRBY.

REFERENCES CITED

The following references are of record in the file of this patent:

UNITED STATES PATENTS

| Number | Name | Date |
|---|---|---|
| D. 146,811 | Schaub | May 20, 1947 |
| D. 156,390 | Wenpetren | Dec. 6, 1949 |
| 1,101,458 | Levoy et al. | June 23, 1914 |
| 1,164,228 | Seufer | Dec. 14, 1915 |
| 1,310,651 | De Long | July 22, 1919 |
| 1,658,302 | Renaud | Feb. 7, 1928 |
| 1,958,312 | Potts et al. | May 8, 1934 |
| 2,426,432 | Breckner et al. | Aug. 26, 1947 |
| 2,532,004 | Zepp | Nov. 28, 1950 |